United States Patent
Müntener et al.

(10) Patent No.: US 10,634,184 B2
(45) Date of Patent: Apr. 28, 2020

(54) METHOD FOR PRODUCING A PROFILED HOLLOW SHAFT FOR A TELESCOPIC STEERING SHAFT AND TELESCOPIC STEERING SHAFT

(71) Applicants: ThyssenKrupp Presta AG, Eschen (LI); thyssenkrupp AG, Essen (DE)

(72) Inventors: Herbert Müntener, Ruggell (LI); Werner Gstach, Frastanz (AT)

(73) Assignee: thyssenkrupp AG, Essen (DE)

( * ) Notice: Subject to any disclaimer, the term of this patent is extended or adjusted under 35 U.S.C. 154(b) by 337 days.

(21) Appl. No.: 15/529,887

(22) PCT Filed: Sep. 22, 2015

(86) PCT No.: PCT/EP2015/071730
§ 371 (c)(1),
(2) Date: Aug. 8, 2017

(87) PCT Pub. No.: WO2016/082969
PCT Pub. Date: Jun. 2, 2016

(65) Prior Publication Data
US 2017/0328400 A1    Nov. 16, 2017

(30) Foreign Application Priority Data
Nov. 26, 2014   (DE) ........................ 10 2014 017 407

(51) Int. Cl.
*B21D 53/10* (2006.01)
*B21D 15/02* (2006.01)
(Continued)

(52) U.S. Cl.
CPC .............. *F16C 3/035* (2013.01); *B21D 15/02* (2013.01); *B21D 53/10* (2013.01); *B21D 53/88* (2013.01);
(Continued)

(58) Field of Classification Search
CPC ........ B21D 15/00; B21D 15/02; B21D 17/00; B21D 17/04; B21D 53/10; B21D 53/88;
(Continued)

(56) References Cited

U.S. PATENT DOCUMENTS

| 803,232 A | * | 10/1905 | Dove ...................... B21B 19/02 |
| | | | 72/100 |
| 1,033,568 A | * | 7/1912 | Fell ........................ B21B 19/02 |
| | | | 72/100 |

(Continued)

FOREIGN PATENT DOCUMENTS

| CH | 579427 | 9/1976 |
| CN | 2511410 | 9/2002 |

(Continued)

OTHER PUBLICATIONS

International Search Report and Written Opinion for International Application No. PCT/EP2015/071730 dated Jan. 8, 2016, 3 pages.

(Continued)

*Primary Examiner* — Teresa M Ekiert
(74) *Attorney, Agent, or Firm* — RMCK Law Group PLC (57) ABSTRACT

The present disclosure relates to a method for producing a profiled hollow shaft for a telescopic steering shaft of a motor vehicle. A hollow shaft to be machined and a roller forming head having at least one roller are provided. A groove is produced in the hollow shaft by moving the hollow shaft relative to the roller forming head. In order to provide an improved and less expensive method for producing a profiled hollow shaft for a telescopic steering shaft of a motor vehicle, the hollow shaft is moved relative to the roller forming head exclusively in the direction of the longitudinal axis of the hollow shaft. The disclosure also relates to a steering shaft having rolling body raceways.

6 Claims, 3 Drawing Sheets

(51) Int. Cl.
*B21H 1/20* (2006.01)
*B21H 7/18* (2006.01)
*B21D 53/88* (2006.01)
*B21H 1/18* (2006.01)
*B21D 17/04* (2006.01)
*F16C 3/035* (2006.01)
*B62D 1/185* (2006.01)

(52) U.S. Cl.
CPC ............... *B21H 1/18* (2013.01); *B21H 1/20* (2013.01); *B21H 7/187* (2013.01); *B62D 1/185* (2013.01); *B21D 17/04* (2013.01); *F16C 2220/44* (2013.01); *F16C 2326/24* (2013.01)

(58) Field of Classification Search
CPC .... B21H 1/18; B21H 1/20; B21H 1/22; B21B 19/02; B21B 19/008; B21B 25/025; B21B 27/037; B21B 2023/005
See application file for complete search history.

(56) References Cited

U.S. PATENT DOCUMENTS

| | | | |
|---|---|---|---|
| 3,928,997 A * | 12/1975 | Laws | B21D 15/02 |
| | | | 72/178 |
| 4,460,116 A | 7/1984 | Bolt | |
| 4,995,252 A | 2/1991 | Robertson et al. | |
| 8,460,116 B1 | 6/2013 | Smith | |
| 2003/0100377 A1 | 5/2003 | Schwarzler et al. | |
| 2006/0181069 A1 | 8/2006 | Yamada | |
| 2012/0144952 A1 | 6/2012 | Heintschel et al. | |
| 2014/0116668 A1* | 5/2014 | Maniar | B21D 17/04 |
| | | | 72/370.19 |

FOREIGN PATENT DOCUMENTS

| | | |
|---|---|---|
| CN | 1946948 A | 4/2007 |
| CN | 201884466 U | 6/2011 |
| DE | 3513340 A1 | 10/1986 |
| DE | 3715393 A1 | 2/1988 |
| DE | 102008041155 A1 | 2/2010 |
| EP | 0427542 A2 | 5/1991 |
| EP | 1693579 A2 | 8/2006 |
| FR | 1331015 A | 6/1963 |
| GB | 2071539 A | 9/1981 |
| JP | H10314837 A | 12/1998 |
| JP | 2006112623 A | 4/2006 |
| JP | 2010053937 A | 3/2010 |
| SE | 525750 C2 | 4/2005 |
| WO | 2010013273 A1 | 2/2010 |

OTHER PUBLICATIONS

Chinese Office Action for CN Application No. 201580063929.1 dated May 2, 2018, 8 pages.
Chinese Office Action for CN Application No. 201580063929.1 dated Aug. 2, 2019, 9 pages.

* cited by examiner

METHOD FOR PRODUCING A PROFILED HOLLOW SHAFT FOR A TELESCOPIC STEERING SHAFT AND TELESCOPIC STEERING SHAFT

CROSS-REFERENCE TO RELATED APPLICATIONS

This application is a 371 U.S. National Stage of International Application No. PCT/EP2015/071730, filed Sep. 22, 2015, which claims priority to German Application No. 10 2014 017 407.7 filed on Nov. 26, 2014. The disclosure of each of the above applications is incorporated herein by reference in their entirety.

FIELD

The disclosure relates to steering shafts for motor vehicles and a method of forming same. A method for producing a profiled hollow shaft for a telescopic steering shaft of a motor vehicle is provided. A hollow shaft to be machined and a roller forming head having at least one roller are provided. A groove is produced in the hollow shaft by moving the hollow shaft relative to the roller forming head.

BACKGROUND

Telescopic steering shafts in motor vehicles enable an adjustability of the steering shaft, so that the position of the steering wheel can be adjusted in the longitudinal direction of the steering shaft. Furthermore, in event of a crash the steering shaft can be shoved together, which effectively prevents the steering shaft from moving further into the interior of the passenger compartment and causing injuries to the passengers. This is generally accomplished by providing two mutually telescoping shafts or hollow shafts which together form a steering shaft, which can be shortened or extended appropriately by telescoping relatively movement of the shafts.

U.S. Pat. No. 8,460,116 discloses a roll sliding shaft, consisting of an inner and outer shaft, between which linear ball guideways are arranged. In order to provide the outer ball raceways, the outer shaft of the roll sliding shaft is formed from circular ring segments. This results in a relatively complicated design of a plurality of individual components.

DE10 2008 041 155 A1 proposes an outer tube for a telescopic steering shaft, which is an outer shaft surrounding an inner shaft. In the radial space between the shafts, balls are arranged. These balls roll during the telescoping in parallel with the longitudinal axis of the steering shaft against the outside of the inner shaft and the inside of the outer shaft and thereby ensure an easy adjustability. For this, groovelike ball raceways with cross section in the shape of a circle segment are formed in the outer tube, extending axially in the longitudinal direction. To form the ball raceways, the outer tube comprises a wall thickness varying over the circumference, resulting in a relatively large fabrication cost to generate the cross sectional geometry of the outer tube.

A similarly formed telescopic steering shaft is described in EP 1 693 579 A2. This likewise comprises balls arranged between the mutually telescopic shafts and able to roll in the direction of the longitudinal axis. In this design, the inner and the outer shaft are provided with radially opposite, corresponding ball raceways. The inner shaft is formed as a massive forged piece and the outer shaft comprises a complex cross sectional geometry, similar to that in the aforementioned DE 10 2008 041 155 A1.

A method of making a profiled hollow shaft is known from CH 579 427 A5, in which a hollow shaft is turned about its longitudinal axis during its machining by a roller forming head with ringlike profiled rolls or rollers, so that consecutive single rolling processes by a respective roll are set down next to each other along a helical zone of the hollow shaft surface. In this way, profiled hollow shafts can be made with high precision. The required turning and advancing movement and the rapidly following abrupt single rolling processes, however, make the known method technically complicated, time intensive, and accordingly costly, and therefore not suited to the making of steering shafts.

The drawback of the telescopic steering shafts known in the prior art is the relatively large fabrication expense to form the grooves serving as the ball or rolling body raceways.

Starting from the known prior art, one problem which the present invention proposes to solve is to provide an improved and more economical method for making a profiled hollow shaft for a telescopic steering shaft of a motor vehicle.

SUMMARY

Accordingly, a method is proposed for producing a profiled hollow shaft for a telescopic steering shaft of a motor vehicle, involving the providing of a hollow shaft to be machined and a roller forming head having at least one roller, wherein a groove is produced in the hollow shaft by moving the hollow shaft relative to the roller forming head, wherein it is proposed according to the invention that, in order to form a groove, the hollow shaft is moved relative to the roller forming head exclusively in the direction of the longitudinal axis of the hollow shaft.

One special feature of the method according to the invention is that it makes do without a complicated rotational movement during the roller forming. A hollow shaft being machined is moved in a purely linear advancing movement through a roller forming head, while at least one roller, preferably several rollers act mechanically on the outer sleeve surface of the hollow shaft. In this way, each time a roller shapes a groovelike depression running in the longitudinal direction parallel to the longitudinal axis of the hollow shaft.

One benefit of the invention is that, as compared to the forming methods known in the prior art for making profiled hollow shafts, there does not need to be any combined rotational advancing movement of the workpiece, so that the fabrication layouts can be less complex. Furthermore, significantly reduced cycle times are achieved, which enables an especially streamlined production. Only the high productivity achieved in this way makes the use of a roller forming process economically suitable in the production of telescopic steering shafts for the automotive industry.

When creating a groove, material is moved from a circumferential area with a starting radius into a circumferential area with a smaller radius than that of the starting radius. The groove formed serves as a shape element for transmitting the torque of a rotary movement of the telescopic steering shaft.

In order to produce a telescopic steering shaft, an outer hollow shaft and an inner hollow shaft telescopically situated inside it are arranged with grooves corresponding to each other. The groove in the inner sleeve surface of an outer hollow shaft is formed by means of the not inwardly displaced area of the hollow shaft according to the method of the invention. On the contrary, the groove in an outer sleeve surface of an inner hollow shaft is formed by the inwardly displaced area of the hollow shaft during the roller forming.

The base area of the groove or the groove base area is understood to be the surface region subtended by the edge of the groove, which in the case of the inner hollow shaft has not been displaced by the forming process and accordingly forms the largest radius area on either side of the respective groove. In other words, it is the area of the free opening cross section of the groove. In the case of the outer hollow shaft, the base area of the groove is subtended by the edge of the groove which is formed by the smallest radius area on either side of the respective groove.

The crux of a manufacturing layout to carry out the method according to the invention is the roller forming head, having at least one, but generally a plurality of rollers. The rollers are mounted on axes of rotation transversely to the machining direction, in which a hollow shaft being machined is moved in linear fashion past the rollers in the direction of its longitudinal axis. With their outer circumference, the rollers in a roller forming head according to the invention can roll against the outer sleeve surface of a hollow shaft introduced into the roller forming head only in the direction of the longitudinal axis. With their outer circumference, designed as a roller forming profile, the rollers project radially into the open cross section of a machining pass. If a hollow shaft blank in the form of a tube segment—such as a round or polygonal tube—is advanced in linear manner in the longitudinal direction into the machining pass, the rollers roll by their roller forming profile against the hollow shaft only in the direction of the longitudinal axis. The radial feeding of the rollers, which indicates how far the roller forming profile projects into the machining pass, determines how deeply grooves are formed in the longitudinal direction as the rollers passes from the outside into the hollow shaft according to the invention.

The grooves in the method according to the invention are formed in the hollow shaft by means of the roller forming head in a cold forming process. By contrast with the prior art, in which a groove is formed by a plurality of abrupt single rolling processes in the radial and axial direction, according to the invention there is a continuous rolling process only in the longitudinal direction. Depending on the material and the thickness of the material of the hollow shaft and the radial depth of the profiling, i.e., the grooves, it is conceivable to accomplish the rated dimension of the hollow shaft profile in a single pass by the roller forming head, for example, during a forward stroke in the longitudinal direction. In this way, especially short cycle times can be achieved. It is likewise possible to achieve the final dimension of the profiling in several passes, each time there being a radial feeding of the rollers between the individual passes. For example, the profiling in a reverse stroke following the mentioned forward stroke can be brought to the final dimension against the longitudinal direction. Preferably, the rollers are arranged in the roller forming head with a fixed axis of rotation, whose spacing is not variable. This significantly lowers the plant costs, since no complicated feeding and adjusting movement of the roller axes needs to be done. In the event that the production of the hollow shaft is to be done with several steps using different feeding of the rollers, several different roller forming heads can be used having respectively axial spacings of the axes of rotation of the rollers which are different from each other, yet firmly established for each roller forming head. It is also conceivable and possible here to provide different roller contours in the different roller forming heads for the forming of the grooves, in order to specifically influence the forming process.

Preferably, the method calls for the generating of the at least one groove with a length on the hollow shaft by a continuous forward stroke of the hollow shaft relative to the roller forming head along the length, wherein the roller of the roller forming head rolls along the hollow shaft continuously in the longitudinal direction. By a continuous stroke is meant a linear movement in one stroke direction with no reversal of movement, preferably with no interruption of movement. Accordingly, the forming of an entire groove occurs in an uninterrupted linear movement relative to the rollers for the entire length of the groove. The linear movement can occur with uniform speed or with a given speed profile. Unlike the prior art, which calls for several discontinuous single movements, by the method of the invention a groove can be formed in a onetime continuous linear movement. The feeding of the rollers in the roller forming head can be set in advance to a final dimension, with the cross section of the machining pass adjusted prior to the first forward stroke when introducing the hollow shaft corresponding to the desired profiling. Preferably, the feeding of the rollers in the roller forming head is preset, that is, the roller forming head has no adjustment mechanism with which the spacing of the roller axes can be changed. In the most simple case, the axes on which the rollers are mounted are fixed in recesses in the roller forming head.

Preferably it is provided that after a forward stroke the hollow shaft is retracted by a continuous reverse stroke relative to the roller forming head. The grooves in the case of hollow shafts for use in steering shafts extend from one end for a predetermined groove length which is less than the shaft length, i.e., the respective overall length of the inner or outer hollow shaft. The reverse stroke or retraction movement therefore needed to remove a hollow shaft from the roller forming head after a forward stroke is likewise preferably done in a continuous linear movement, like the forward stroke. If the final dimension of the profiling has already been established in the forward stroke, the rollers remain in their radial feed position, so that during the reverse stroke a roller forming is performed with less feeding on account of the elastic recoil of the hollow shaft in the radial direction, thereby improving the dimensional precision and the surface quality of the roll formed grooves.

The forming of a groove in a continuous work stroke—for example, during a forward or reverse stroke—has the advantage that especially short cycle times can be achieved, which goes to the benefit of a rational manufacturing of steering shafts. Furthermore, thanks to the machining occurring exclusively in the longitudinal direction continuously, a microscopic surface texture can be created which is optimally adapted to the relative longitudinal displacement of inner and outer shaft during the telescoping of a steering shaft. For example, the groove surface is especially smooth in the longitudinal direction, so that the sliding behavior of the shafts is improved during the changing of position and during the minimal shifting movements occurring during the vehicle operation on account of the elasticities of the motor vehicle.

The linear relative movement between the hollow shaft and the roller forming head can be realized with slight expense on manufacturing technology. For example, it is possible to clamp a hollow shaft blank on a motor-driven linear feed unit, which pushes the hollow shaft during travel in the longitudinal direction in a forward stroke into the machining pass of the roller forming head between the rollers. By the travel of the feed unit opposite the longitudinal direction, a reverse stroke is accomplished, with which the hollow shaft is pulled out from the roller forming head. Alternatively or additionally, it is possible to drive the rollers of the roller forming head in rotation by a motor. When introduced into the machining pass, a hollow shaft is grabbed by the rotating rollers and—if the direction of rotation corresponds to a circumferential movement in the longitudinal direction of the hollow shaft—delivered in a forward stroke between the rollers. The profile cross section formed in this way on the outer circumference of the rollers is formed into the outer circumference of the hollow shaft. By a reversal of the direction of turning against the longitudinal direction, the already completely or partly profiled hollow shaft can be delivered in a reverse stroke out from the roller forming head.

One possible embodiment of the method according to the invention calls for shoving a profile mandrel into the hollow shaft and moving it in common with the hollow shaft during the movement of the hollow shaft relative to the roller forming head. The profile mandrel forms an abutment with regard to the forces acting from the outside through the rollers on the hollow shaft during the forming of the grooves. Thanks to the common movement of hollow shaft and profile mandrel, no relative movement in the longitudinal direction between hollow shaft and profile mandrel occurs during the forming of the grooves by the roller forming head, which minimizes frictional losses.

On its outer circumference the profile mandrel is fashioned with a cross sectional contour which serves as a negative counter mold or die for the groove profile formed during the roller forming radially from the outside in the wall of the hollow shaft. During the making of an outer hollow shaft, the material is rolled into the outer profile of the profile mandrel, so that the inside of the outer hollow shaft is cold formed according to the groove geometry dictated by the profile mandrel and a groove profile is obtained for form-fitting reception of an inner hollow shaft. The groove profile formed on the outside of an inner shaft is dictated by the working profile on the outer circumference of the rollers. By cold forming, the groove profile is introduced into the outside of the hollow profile as an impression of the roller profile in the longitudinal direction.

An alternative embodiment of the method according to the invention calls for moving a hollow shaft empty through the roller forming head past the rollers in order to generate at least one groove. In this context, "empty" means that no mandrel or other body is arranged in the open continuous cross section of a hollow shaft being profiled such as might be apt to bear against the wall of the hollow shaft during the cold forming to generate the grooves or support the formation of the grooves. Surprisingly, it has been found that both the generating of grooves in the outer surface of an inner hollow shaft and in the inner surface of an outer hollow shaft with the required properties can be accomplished without using a profile mandrel. Especially preferably, grooves can be introduced in this way in hollow profiles with a diameter less than 30 mm, based on the outer diameter of an inner hollow profile or the inner diameter of an outer hollow profile.

An especially preferred embodiment of the method according to the invention calls for the steering shaft to be linearly mounted in roller bearings in the direction of the longitudinal axis, wherein a groove in a hollow shaft is formed as a rolling body raceway to receive at least one rolling body which is able to roll. By a steering shaft linearly mounted in roller bearings is meant a design in which rolling bodies such as balls are arranged between the inner and the outer hollow shaft, which roll against the oppositely directed circumferential surfaces of the nested hollow shafts during a telescopic movement. Examples of such steering shafts mounted in roller bearings are mentioned in the above-described prior art, such as EP 1 693 579 A2 or DE 10 2008 041 155 A1.

For its fashioning as a rolling body raceway, the groove is formed such that a rolling body, such as a cylindrical roller or a ball, can be inserted and can move guided along the longitudinal axis, rolling in the groove, with more than an eighth of the largest diameter of the rolling body projecting beyond the groove base area, i.e., from the area of the free groove opening. Especially preferably, the groove is generated such that it is designed to be a raceway for a rolling body in the form of a ball. This means that the groove is formed such that a ball can be inserted, which can move guided along the longitudinal axis, rolling in the groove and more than an eighth of the ball diameter projects beyond the groove base area. Preferably, the rolling body—cylindrical roller or ball—projects by more than half of the largest diameter from the groove base, in other words, by more than half from the groove.

In steering shafts linearly mounted in roller bearings, grooves running in the longitudinal direction on the inner surface of the outer hollow shaft and/or the outer surface of the inner hollow shaft serve as rolling body raceways, also called hereafter ball raceways, in which the balls or other rolling bodies roll during the telescoping. High demands in terms of precision and surface quality are placed on the profile geometry of such ball raceways as well as the cross sectional geometry of the nested telescopic shafts of a steering column. At the same time, a rational and cost-efficient fabrication is required. Thanks to the method of the invention, for the first time grooves can be made in hollow shafts which are suitable as ball raceways and which optimally meet the aforementioned demands. It is especially noteworthy that the rolling body raceways can be realized in the above-described embodiment of the method which calls for the roller forming of an empty hollow shaft, without the use of a profile mandrel introduced into the hollow shaft. Especially for the fabrication of roller mounted steering columns with smaller diameters, the method brings manufacturing technology, functional, and economic advantages when producing the inner and the outer hollow shaft according to this embodiment of the method of the invention.

Preferably, a hollow shaft is designed as the inner hollow shaft and comprises on its outer circumference at least one rolling body raceway, which is introduced from the outside by a roller forming head, whose roller comprises a convex roller forming profile corresponding to the negative cross section of the rolling body raceway. Thanks to the roller forming profile of the roller which is formed during the rolling process in direct contact in the surface of the hollow shaft, the cross sectional geometry of the groove forming the rolling body raceway can be generated with high precision.

A further preferred embodiment of the invention calls for fashioning a hollow shaft as the outer shaft and having on its inner circumference at least one rolling body raceway, which is introduced from outside by a roller forming head, whose roller comprises a concave roller forming profile following the cross section of the rolling body raceway. The generating of the grooves serving as ball raceways in the inner surface of the outer hollow profile is done by radially deforming the wall inward by the edges of the concave roller forming profile of the roller pressed from the outside against the hollow shaft. In this way, the ball raceway situated on the inside is indirectly formed by the outside of the hollow shaft, without the roller during the machining process having direct contact with the surface of the ball raceway. It turns out that, giving consideration to the aforementioned parameters such as diameter, wall thickness, cross sectional shape and material of the hollow shaft, the cross section geometry of a ball raceway can likewise be realized rationally and precisely by the method according to the invention during the indirect forming.

It is especially advantageous for at least one roller to comprise a Gothic profile in cross section. A Gothic profile, also known as a pointed profile, is distinguished by two arc segments, which are joined together tilted at an angle relative to each other, so that a point or kink is formed. This is accomplished in that the first center point of the first arc segment is offset relative to the second center point of the second arc segment, and this by a given spacing in the direction of the opposite arc segment. The Gothic profile is in mirror symmetry with respect to a mirror axis passing through the point of the cross section; accordingly, the aforementioned first and second center points each lie in mirror symmetry with their respective half spacing on either side of said mirror axis. For a convex profile cross section, the point lies on the outermost circumference of the roller, and accordingly for a groove formed by the roller directly in a surface of an (inner) hollow shaft it lies at the lowest point of the groove. For a concave profile cross section of the roller, the point lies in the innermost circumference of the roller cross section, which forms the wall of an (outer) hollow shaft, so that on the inside of the hollow shaft away from the roller a rolling body raceway with a Gothic profile cross section is formed. Because the radius of the arcs of the Gothic profile is larger in dimension than the diameter of the balls, each time there is a point contact created at two places between the ball raceway and a ball. In this way, especially good running properties are achieved with exact guidance, uniform load distribution, and great rigidity.

Preferably, the generating of the total number of a plurality of grooves present in the hollow shaft is done in a single common work step with a continuous forward stroke. The total number refers to all grooves which are formed in a hollow shaft.

Preferably, for each groove in the hollow shaft there is provided a separate roller in the roller forming head, while the rollers for generating the grooves roll against the hollow shaft at the same time. In this way, it is possible to generate a plurality of grooves in the hollow shaft in the direction of the longitudinal axis of the hollow shaft in a single work step. In this way, by means of an axial relative movement of the hollow shaft relative to the rollers of the roller forming head, the entire forming process to generate the grooves in the hollow shaft can be performed. This produces a substantial time saving, so that much shorter cycle times are possible as compared to traditional manufacturing methods for the profiling of the hollow shaft or for the forming of the grooves in the hollow shaft.

Furthermore, a simultaneous forming of the grooves to be generated in the hollow shaft in the case of a symmetrical arrangement of the grooves in the hollow shaft can result in a substantially symmetrical force action of the rollers of the roller forming head in the radial direction on the hollow shaft. This is especially advantageous for the design of the roller forming head. A symmetrical force pattern means fewer demands on the supporting action of the individual components of the roller forming head. Furthermore, the symmetrical force pattern significantly reduces the moments created in a bearing of the roller forming head, which may result in a reduction of the design and manufacturing costs of the roller forming head.

Moreover, a symmetrical force action also has a positive impact on the properties of the profiled hollow shaft. Thus, the hollow shaft experiences uniform bending processes during the cold forming, so that uniform grooves are produced on the hollow shaft. The result is a symmetrical body of revolution with a homogeneous material distribution.

The providing of a separate roller in the roller forming head for each groove being generated in the hollow shaft thus makes it needless to reposition the angle of the hollow shaft relative to the roller forming head. In this way, on the one hand the machining time to generate a profiled hollow shaft and on the other hand the complexity of the method for producing the profiled hollow shaft can be reduced.

The problem which the present invention proposes to solve is also solved by a steering shaft and related methods disclosed herein.

Accordingly, a steering shaft for a motor vehicle is proposed, comprising an inner hollow shaft and an outer hollow shaft, which are arranged coaxially to each other and are telescopic with respect to each other, wherein the inner hollow shaft and the outer hollow shaft comprise rolling body raceways extending in the direction of the longitudinal axis, each being radially opposite each other between the shafts, while between the inner hollow shaft and the outer hollow shaft there is arranged at least one rolling body, which rolls against the radially opposite rolling body raceways, and at least one of the two shafts of the steering shaft is produced according to the above-described method.

In this way, it is possible to produce a linearly roller-supported steering shaft for a motor vehicle with less manufacturing expense and shorter cycle times and therefore more economically than in the prior art. The hollow shafts with rolling body raceways produced by the method according to the invention are distinguished by especially advantageous properties for the telescoping, which are described above.

Especially preferably, at least one of the rolling body raceways of the inner hollow shaft and/or the outer hollow shaft comprises a Gothic profile looking in cross section. This shape, also known as a pointed profile, comprises two arcs, preferably circular arcs, which pass into each other at an angled point. Because the radius of the arcs of the Gothic profile is larger in dimension than the diameter of the balls used as the rolling body, each time there is a point contact created at two places between the ball raceway (rolling body raceway) and a ball. In this way, especially good running properties are achieved with exact guidance, uniform load distribution, and great rigidity. By means of the method according to the invention, rolling body raceways can be formed both in the outer surface of an inner hollow shaft and in the inner surface of an outer hollow shaft.

A preferred embodiment of the invention calls for at least one rolling body being a ball, which makes contact with at least one of the rolling body raceways at two circumferential points, at a pressing angle $\phi$ lying in the range of 70 to 110°. Thanks to the configuration of the profile of the rolling body raceway, for example as a Gothic profile as described above, a ball is each time in contact with the surface of the respective rolling body raceway at only two points. This minimizes the rolling friction, which goes to the benefit of an easy adjustability during the telescoping of the steering column. Furthermore, the wear is thus minimized. The setting of the pressing angle in the indicated range is especially advantageous in regard to the distribution of the force channeled into the rolling body raceway.

It is advantageous to arrange a sheath between the inner hollow shaft and the outer hollow shaft, this sheath receiving the at least one rolling body. The sheath forms a cage for the rolling body, preferably a ball cage, in which usually several rolling bodies are held, free to turn, but in a defined position relative to the sheath and to each other. This rolling body cage ensures that the rolling bodies are held in captive manner between the hollow shafts. Furthermore, several rolling bodies can be guided at the same position in the longitudinal direction for a plurality of rolling body raceways, and several rolling bodies inside a rolling body raceway can be held at constant spacing from each other in the longitudinal direction. The positioning of the rolling bodies relative to each other and to the rolling body raceways which is accomplished by the sheath ensures an optimal arrangement of the rolling bodies at all times, namely, in terms of the stability of the steering column, the channeling of forces into the bearing, and low friction.

In cross section, the hollow shafts are preferably rotationally symmetrical, both in regard to their basic cross sectional shape and also—especially preferably adapted to this basic cross sectional shape—in regard to the arrangement of the grooves serving as the rolling body raceways. For example, the hollow shafts can have a quadrangular cross section, here preferably a square one, while four rolling body raceways can be arranged symmetrically on all four sides, or also two rolling body raceways symmetrically on opposite sides. Accordingly, hollow shafts with a basic triangular shape can comprise three rolling body raceways; with a hexagonal basic shape, it is conceivable to provide two, three, four or six rolling body raceways in mirror symmetry or rotationally symmetrical arrangement.

DESCRIPTION OF THE DRAWINGS

Advantageous embodiments of the invention shall be explained more closely below with the help of the drawings. There are shown specifically.

DETAILED DESCRIPTION

The figures show preferred sample embodiments of the invention, the same parts always being provided with the same reference numbers and therefore as a rule only being mentioned or designated once.

Figure 1:
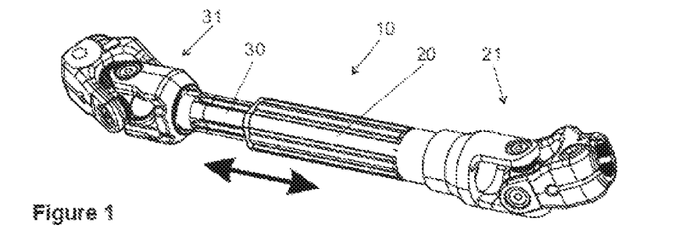
FIG. 1 is a schematic perspective view of a steering shaft.

FIG. 1 shows in perspective view a schematically represented steering shaft 10, having an outer hollow shaft 20 and an inner hollow shaft 30, which are telescopic with respect to each other in the direction of the longitudinal axis, i.e., in the longitudinal direction indicated by the double arrow.

The outer hollow shaft 20 comprises at its free end, which is facing away from the inner shaft 30 in the longitudinal direction, a fork 21, which forms part of a universal joint, by which the steering shaft 10 is connected by torque locking to the steering train. Accordingly, the inner hollow shaft 30 comprises at its free end, which is facing away from the outer shaft 20 in the longitudinal direction, a fork 31, which forms part of another universal joint, by which the steering shaft 10 is connected by torque locking to the steering train. The hollow shafts 20 and 30 are preferably made of good cold-forming steel.

Figure 2:
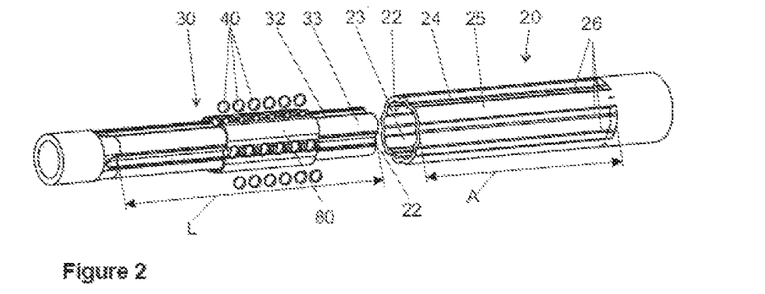
FIG. 2 is a portion of a steering shaft per FIG. 1 in disassembled state.

FIG. 2 shows part of the steering shaft 1 per FIG. 1 in an exploded view, where the individual components are shown in a state dismantled from each other. As can be seen, the outer shaft 20 is profiled in its region facing the inner shaft 30, into which the inner hollow shaft 30 can be shoved telescopically in the longitudinal direction. The profiling of the outer shaft 20 comprises grooves 22, which extend in the longitudinal direction for a length A in the inner sleeve surface 23 of the outer shaft 20. The length A extends from the end facing the inner shaft 30 along a partial segment of the outer shaft 20 which is less than its entire length. The grooves 22 are matched up with opposite convex projecting bulgelike formations 24 in the outer sleeve surface 25, exterior to the wall of the hollow shaft 20. These formations 24 are bounded in the circumferential direction at either side by groove-shaped regions 26 on the outside. In the embodiment shown, four grooves 22 are arranged so as to be distributed uniformly about the circumference of the hollow shaft 20. The grooves 22 are fashioned as rolling body raceways, or more specifically as ball raceways, as will be further explained below.

The end segment of the inner hollow shaft 30, facing the outer hollow shaft 20 and able to be shoved telescopically into the latter, is likewise profiled as shown in FIG. 1. The profiling comprises grooves 32, which extend from the end which can be shoved into the outer hollow shaft 20 in the outer sleeve surface 33 of the hollow shaft 30 for a length L in the longitudinal direction. The length L extends along the partial segment of the inner hollow shaft 30 which can be shoved into the outer hollow shaft 20 in the longitudinal direction.

Figure 3:
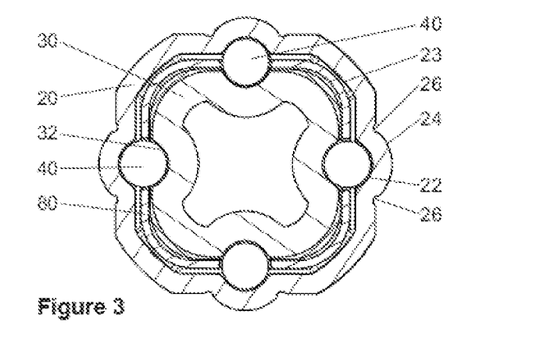
FIG. 3 is a cross sectional view of a steering shaft per the preceding figures.

By comparing FIG. 2 with the cross sectional representation of FIG. 3 it can be seen that rolling bodies, namely balls 40, are arranged radially between the grooves 22 and 32. Each time, a plurality of balls 40 are arranged one after the other in the longitudinal direction in the grooves 22 and 32. These are held with defined spacing from each other and free to rotate in a sheath 80, fashioned as a ball cage 80. At the same time, the sheath 80 ensures that adjacent balls 40 in the circumferential direction remain each time in the same position in regard to the longitudinal direction.

The embodiment shown in FIG. 3 shows a quadrangular, specifically a square basic cross section of the hollow shafts 20 and 30. The grooves 22 and 32 are each time arranged symmetrically at the center of one side of the square.

Figure 13:
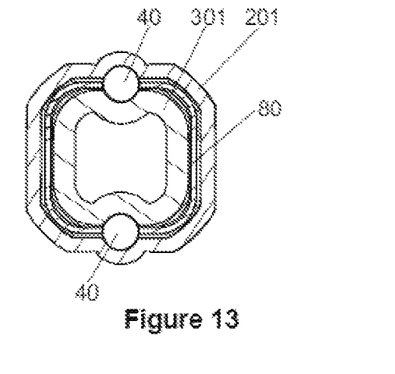
FIG. 13 is a cross sectional view of a steering shaft in a second embodiment.

A second embodiment similar to the representation of FIG. 3 is shown in FIG. 13. By contrast with the first embodiment, this one comprises only two rows of balls 40 in total, which roll in grooves 22 and 32 between an outer hollow shaft 201 and an inner hollow shaft 301, being situated symmetrically on two opposite sides of the square.

Figure 4:
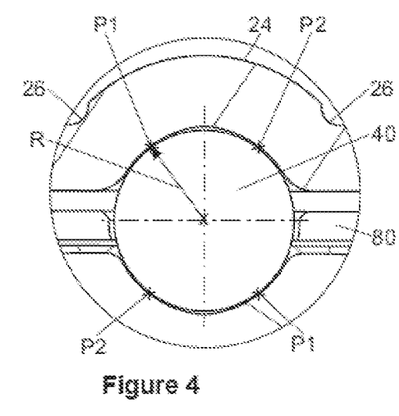
FIG. 4 is a detail view of the sectional representation per FIG. 3 in the area of a rolling body.
Figure 5:
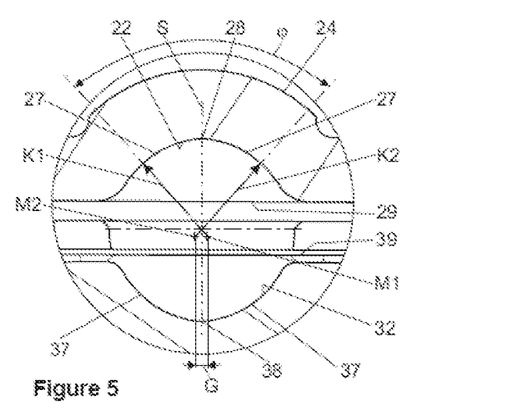
FIG. 5 is a further detail view of the sectional representation per FIG. 3 with rolling body removed.

FIGS. 4 and 5 each time show once more a groove 22 and 32 from FIG. 3 in enlarged view. It will be recognized that the grooves 22 and 32 each time have a Gothic profile. This is formed by two circular arc sections 27 and 37, which meet at an angle at the groove bottom 28 or 38, i.e., forming a point similar to a Gothic pointed arch.

The circular arc sections 27 and 37 each have a radius K1 and K2, wherein K1=K2. The radius center points M1 of K1 and M2 of K2 have a spacing G from each other, being arranged in mirror symmetry to a mirror axis S passing through the point 28. The magnitude of K1 and K2 is greater than the radius R of a ball 40 inserted between the grooves 22 and 32. Thus, each ball 40 lies against precisely two contact points P1 and P2 on a groove 22 and 32, as is shown in FIG. 4. The magnitude of the pressing angle φ, enclosed between the contact points P1 and P2 with respect to the ball center point with radius R, is preferably in the range of 70 and 110°.

The groove 22 has a groove base area 29, the groove 32 has a groove base area 39. As is clearly seen from FIG. 4, each time a ball 40 projects with more than half of its diameter 2*R beyond the respective groove base area 29 or 32. This fulfills the above given definition of a rolling body raceway for the grooves 22 and 32, i.e., they form ball raceways for the balls 40.

Figure 6:
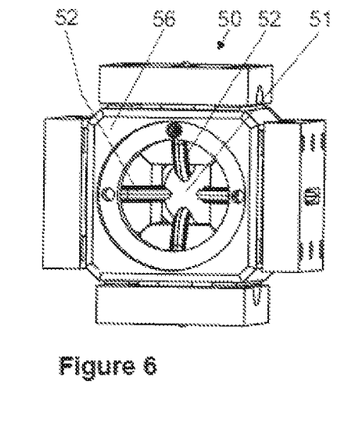
FIG. 6 is a schematic perspective view of a roller forming head.

FIG. 6 shows a roller forming head 50 for making an inner hollow shaft 30 as described above. The roller forming head 50 comprises four rollers 52, which are arranged in rotational symmetry about a machining pass 51. The rollers 52 are arranged with respect to each other at an angle of 90°. Each roller 52 is mounted able to turn in a frame 56 of the roller forming head 50.

Figure 7:
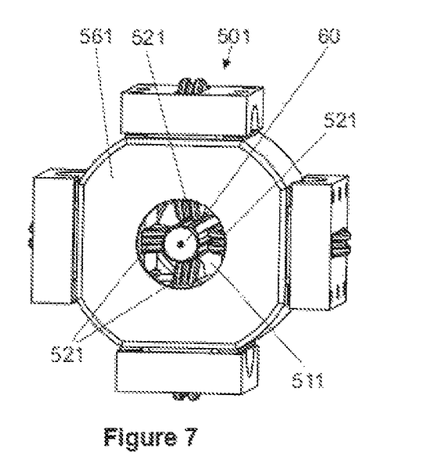
FIG. 7 is a schematic perspective view of a roller forming head in a second embodiment.

The roller forming head 501 shown in FIG. 7 for making the above-described outer hollow shaft 20 comprises a similar layout to the roller forming head 50 for making the inner hollow shaft 30, with a machining pass 511, rollers 521 and a frame 561.

Figure 8:
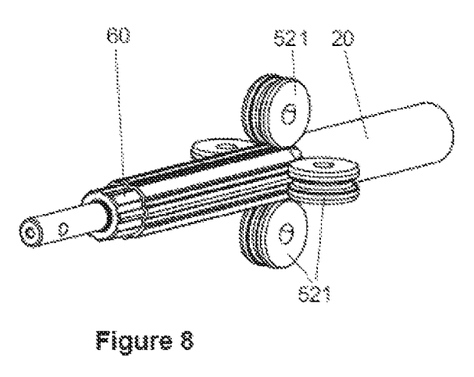
FIG. 8 is a schematic perspective view of the roller arrangement of the roller forming head per FIG. 7.
Figure 9:
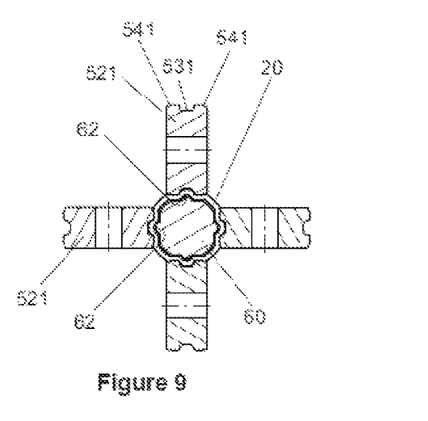
FIG. 9 is a cross sectional view of the roller arrangement per FIG. 7 in the area of the roller.

FIGS. 7, 8 and 9 show a profile mandrel 60, which is arranged in the machining pass 511 of a roller forming head 501 in the middle of the four rollers 521. A gap is provided between the profile mandrel 60 and the rollers 521, so that the profile mandrel 60 can move along the roller forming axis, i.e., the longitudinal axis passing through the machining pass 511, without the rollers 521 rolling against the profile mandrel 60.

FIG. 9 is an enlarged view of the profile mandrel 60 with protrusions 62, forming a gap between the profile mandrel 60 and the rollers 521, roughly corresponding to the profile of a hollow shaft being produced by means of the roller forming head 501.

Figure 10:
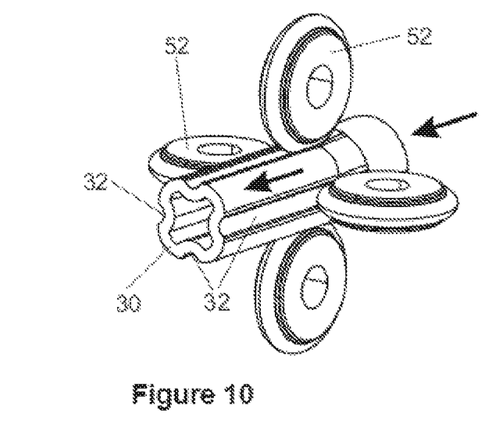
FIG. 10 is a schematic perspective view of the roller arrangement of the roller forming head per FIG. 6.
Figure 12:
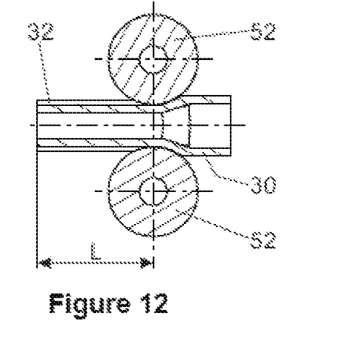
FIG. 12 is a schematic view of a longitudinal section along the longitudinal axis of a roller forming head during a roller forming process.

FIG. 12 shows a section along the longitudinal axis of the machining situation represented in FIG. 10, where a hollow profile 30 has been shoved in between the rollers 52 by a length L in order to generate a groove 32 of length L.

Alternatively, the roller forming head 50 or 501 can also comprise one, two, three, six or more rollers 52 or 521, being arranged about the circumference spaced apart at a corresponding angle from each other.

Figure 11:
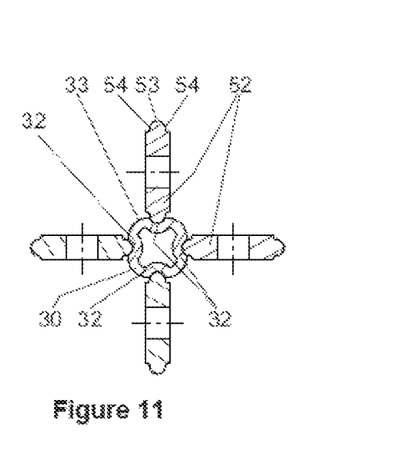
FIG. 11 is a cross sectional view of the roller arrangement per FIG. 10 in the area of the rollers.

FIGS. 9 and 11 show that the rollers 52, 521 are profiled and comprise a roller center profile 53, 531 as well as a roller edge profile 54, 541.

In order to form a ball raceway, the roller center profile 53 has the shape of a convex Gothic profile. The diameter of the roller center profile 53 here is larger than the diameter of the roller edge profile 54.

For the rollers 521, the roller center profile 531 is shaped as a concave Gothic profile. The rollers 521 and the profile mandrel 60 are arranged with respect to each other so that a roller center profile 531 corresponds to a protrusion 62 of the profile mandrel 60.

FIG. 9 shows a cross section of a detail view of a roller forming head 501, wherein the rollers 521 are in contact with an outer hollow shaft 20, having been shoved onto the profile mandrel 60. The outer hollow shaft 20 is cold rolled, so that the outer shaft 20 on its inner sleeve surface receives the profile of the profile mandrel 60 and on its outer sleeve surface 25 it is formed by the rollers 521 and especially by the roller profile.

Since the roller center profile 531 corresponds in cross section to the protrusion 62 of the profile mandrel 60, the material of the outer hollow shaft 20 is forced by the roller center profile 531 onto the protrusion 62 of the profile mandrel 60.

Accordingly, an inner hollow shaft 30 of a steering shaft 10 can be made by means of a roller forming head 50. One difference between the roller forming head 50 and the roller forming head 501 is that the machining of a hollow profile, such as an inner hollow profile 30, can be done without the use of a profile mandrel. For this, a hollow profile 30 is introduced empty, i.e., without a counter tool located in the free passage, into the machining pass 51 of the roller forming head 50. As an illustration, this is shown schematically in FIG. 10, where only the rollers 52 are indicated, and the other elements of the roller forming head 50 have been omitted. The hollow profile 30 is shoved in the direction of the arrow between the rollers 52, the outer sleeve surface 33 being cold deformed by the profile cross section of the rollers 52 to form grooves 32. The situation is shown once more in cross section in FIG. 11.

An alternative embodiment of the method described with the aid of the roller forming head 501 in FIGS. 7, 8 and 9 calls for no profile mandrel 60 to be used. This means that an outer hollow profile 20 is cold deformed empty, as described above for the making of an inner hollow profile 30 with the use of a roller forming head 50. In particular, when the hollow profile cross section is relatively small, it is thus possible to form suitable grooves 22 as rolling body raceways by roller forming in the inner sleeve surface from the outside.

Figure 14:
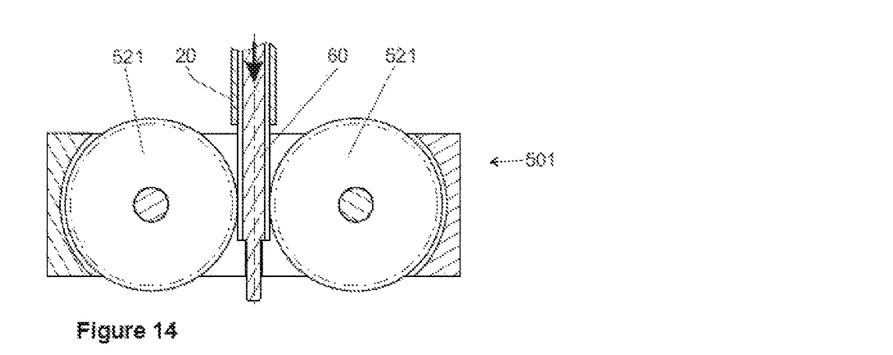
FIG. 14 is a schematic sectional view of a roller forming head when introducing a hollow shaft.
Figure 15:
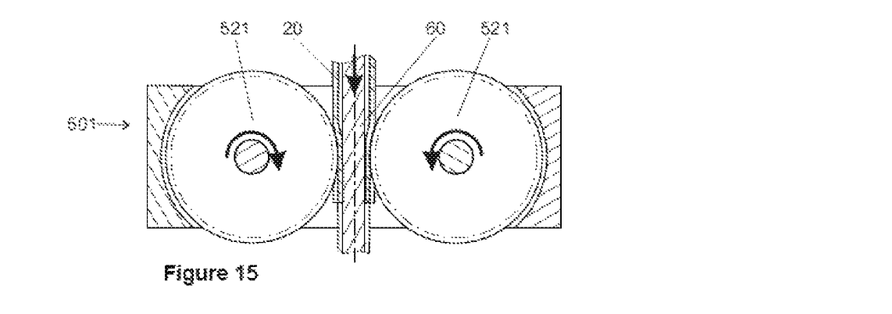
FIG. 15 is a schematic sectional view of the roller forming head per FIG. 14 during a roller forming process with a hollow shaft located therein during a forward stroke.
Figure 16:
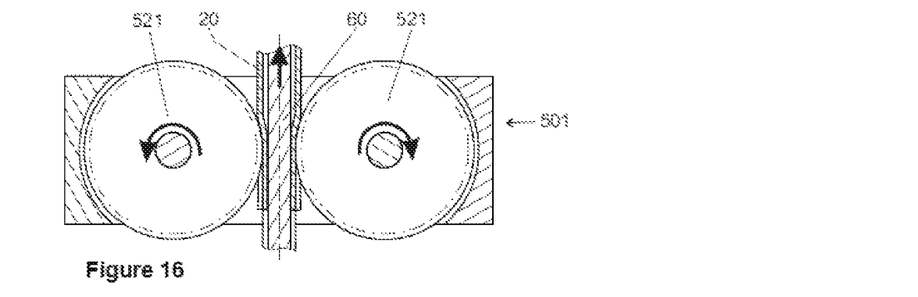
FIG. 16 is a schematic sectional view of the roller forming head per FIG. 15 during a roller forming process with a hollow shaft located therein during a backward stroke.

FIGS. 14 to 16 show the movement sequence of a double stroke for the profiling of an outer hollow shaft 20 by means of a roller forming head 501. These are cross sectional views which show each time two opposing rollers 521, while between the rollers 521 a profile mandrel 60 is arranged, on which an outer hollow shaft 20 is shoved.

FIG. 14 shows a forward stroke of an outer hollow shaft 20 together with the profile mandrel 60. The outer hollow shaft 20 is moved with the profile mandrel 60 relative to the rollers 521. No contact exists between the profile mandrel 60 and the rollers 521, so that the rollers 521 remain in a position of rest. The outer hollow shaft 20 shoved onto the profile mandrel 60 is not yet in contact with the rollers 521 in FIG. 14.

In FIG. 15, the outer hollow shaft 20 together with the profile mandrel 60 is still in the forward stroke, the difference being that now the outer hollow shaft 20 is in contact with the rollers 521. The gap between the profile mandrel 60 and the rollers 521 is now filled up by the outer shaft 20. Thanks to the forward stroke of the outer shaft 20 together with the profile mandrel 60, the rollers 521 are placed in rotation. They roll along the outer circumferential surface of the outer shaft 20, so that the outer hollow shaft 20 undergoes the above-described profiling, as the rollers 521 in the roller center profile 531 have a lesser spacing from the profile mandrel 60 than the not yet formed outer hollow shaft 20.

Once the desired length of the profiling and the associated groove length A of the outer shaft 20 has been reached, the reverse stroke shown in FIG. 16 begins. The outer hollow shaft 20 and the profile mandrel 60 move in common in the opposite direction relative to the forward stroke. Contact continues to exist between the outer shaft 20 and the rollers 521, so that the rollers 521 also rotate in the opposite direction during the reverse stroke. The reverse stroke can be maintained for as long as it takes for the outer hollow shaft 20 and the profile mandrel 60 to leave the roller forming head 501. Alternatively, a new forward stroke can follow on the reverse stroke, for example in order to improve the quality of the profiling of the outer shaft 20.

The method represented in FIGS. 14, 15 and 16 can likewise be used to make hollow shafts 20, 30 without the use of a profile mandrel 60. In this case, the hollow shafts are introduced empty between the rollers 52, 521 of a roller forming head 50, 501.

In order to improve the rolling of the rollers 521 against the shaft being profiled and to minimize pit corrosion in the contact surfaces, it is conceivable and possible to wet the rollers or the shaft with a lubricant at the corresponding contact surface.

Insofar as is applicable, all individual features represented in the individual sample embodiments can be combined with each other and/or exchanged for each other, without leaving the scope of the invention.

LIST OF REFERENCE NUMBERS

10 Steering shaft
20, 201 Outer hollow shaft
21 Fork
22 Groove
23 Inner sleeve surface
24 Formations
25 Outer sleeve surface
26 Formed regions
27 Circular arc section
28 Groove bottom (tip)
29 Groove base area
30, 301 Inner hollow shaft
31 Fork
32 Groove
33 Outer sleeve surface
37 Circular arc section
38 Groove bottom (tip)
39 Groove base area
40 Ball
50, 501 Roller forming head
51, 511 Machining pass
52, 521 Roller
53, 531 Roller center profile
54, 541 Roller edge profile
56, 561 Frame
60 Profile mandrel
80 Sheath
A Length of a groove 22
L Length of a groove 32
G Spacing
K1, K2 Radius
M1, M2 Center point
P1, P2 Contact point
S Mirror axis
$\varphi$ Pressing angle

The invention claimed is:

1. A method for producing a profiled hollow shaft for a telescopic steering shaft of a motor vehicle, the method comprising:
   providing a hollow shaft to be machined, the hollow shaft defining a longitudinal axis;
   providing a roller forming head having at least one roller;
   moving the hollow shaft relative to the roller forming head exclusively in the direction of the longitudinal axis of the hollow shaft; and
   producing a groove in the hollow shaft during the moving of the hollow shaft relative to the roller forming head, wherein producing the groove comprises:
      producing one groove with a length (A, L) on the hollow shaft by a continuous forward stroke of the hollow shaft relative to the roller forming head along the length (A, L), wherein the roller of the roller forming head rolls along the hollow shaft continuously in the longitudinal direction;
      completing the continuous forward stroke; and
      retracting the hollow shaft by a continuous reverse stroke relative to the roller forming head.

2. The method of claim 1 wherein the hollow shaft comprises at least one rolling body raceway on an inner circumference thereof, which is formed by the at least one roller of the roller forming head, the at least one roller having a convex roller forming profile corresponding to a negative cross section of the at least one rolling body raceway.

3. The method of claim 1 wherein the at least one roller comprises a roller having a concave roller forming profile.

4. The method of claim 1 wherein the at least one roller comprises a Gothic profile in cross section.

5. The method of claim 1, further comprising:
   generating a plurality of grooves in the hollow shaft by a common work step with the continuous forward stroke.

6. A method for producing a profiled hollow shaft for a telescopic steering shaft of a motor vehicle, the method comprising:
   providing a hollow shaft to be machined, the hollow shaft defining a longitudinal axis;
   providing a roller forming head having at least one roller;
   providing a profile mandrel;
   locating the hollow shaft between the roller forming head and the profile mandrel;
   moving the hollow shaft relative to the roller forming head in the direction of the longitudinal axis of the hollow shaft;
   producing a groove with a length (A, L) in the hollow shaft during the moving of the hollow shaft by a continuous forward stroke of the hollow shaft relative to the roller forming head along the length (A, L), wherein the roller of the roller forming head rolls along the hollow shaft continuously in the longitudinal direction;

completing the continuous forward stroke; and retracting the hollow shaft by a continuous reverse stroke relative to the roller forming head.

\* \* \* \* \*

UNITED STATES PATENT AND TRADEMARK OFFICE
CERTIFICATE OF CORRECTION

Page 1 of 1

PATENT NO. : 10,634,184 B2
APPLICATION NO. : 15/529887
DATED : April 28, 2020
INVENTOR(S) : Herbert Müntener et al.

It is certified that error appears in the above-identified patent and that said Letters Patent is hereby corrected as shown below:

On the Title Page

Item (73) Assignee should read:
ThyssenKrupp Presta AG, Eschen (LI)
thyssenkrupp AG, Essen (DE)

Signed and Sealed this
Fourteenth Day of July, 2020

Andrei Iancu
*Director of the United States Patent and Trademark Office*